United States Patent [19]

Rohrer

[11] Patent Number: 4,543,759
[45] Date of Patent: Oct. 1, 1985

[54] SUPPORT STRUCTURES

[75] Inventor: Helmuth H. Rohrer, Krugersdorp, South Africa

[73] Assignee: Mosaic King (PTY) Ltd, Krugersdorp, South Africa

[21] Appl. No.: 459,515

[22] Filed: Jan. 20, 1983

[30] Foreign Application Priority Data

Jan. 21, 1982 [ZA] South Africa ............... 82/0400

[51] Int. Cl.$^4$ .................. G09F 7/00; H02B 15/04
[52] U.S. Cl. ............................ 52/475; 52/667; 434/430; 40/605
[58] Field of Search ............ 52/475, 660, 664–668, 52/385, 386; 403/346, 347; 40/605, 447, 450, 618; 434/72, 430

[56] References Cited

U.S. PATENT DOCUMENTS

3,663,717  5/1972  Coster ........................... 52/667
3,748,778  7/1973  Ellies et al. ..................... 52/667

FOREIGN PATENT DOCUMENTS

40409  11/1981  European Pat. Off. ........... 52/475
2919643  5/1979  Fed. Rep. of Germany .
2950472  7/1981  Fed. Rep. of Germany .
1000919  8/1965  United Kingdom .

Primary Examiner—John E. Murtagh
Assistant Examiner—Kathryn L. Ford
Attorney, Agent, or Firm—Cushman, Darby & Cushman

[57] ABSTRACT

A mimic panel is formed by a series of like aluminum strip members. The strip members B are slid through the strip members A and rotated 90° into the position shown in the drawing. Some of the intersections of the members A and B are spot welded together. Mimic tiles 18 are then placed in the structure and held in position by spring clips 20. There are 1600 mimic tiles per square meter.

8 Claims, 2 Drawing Figures

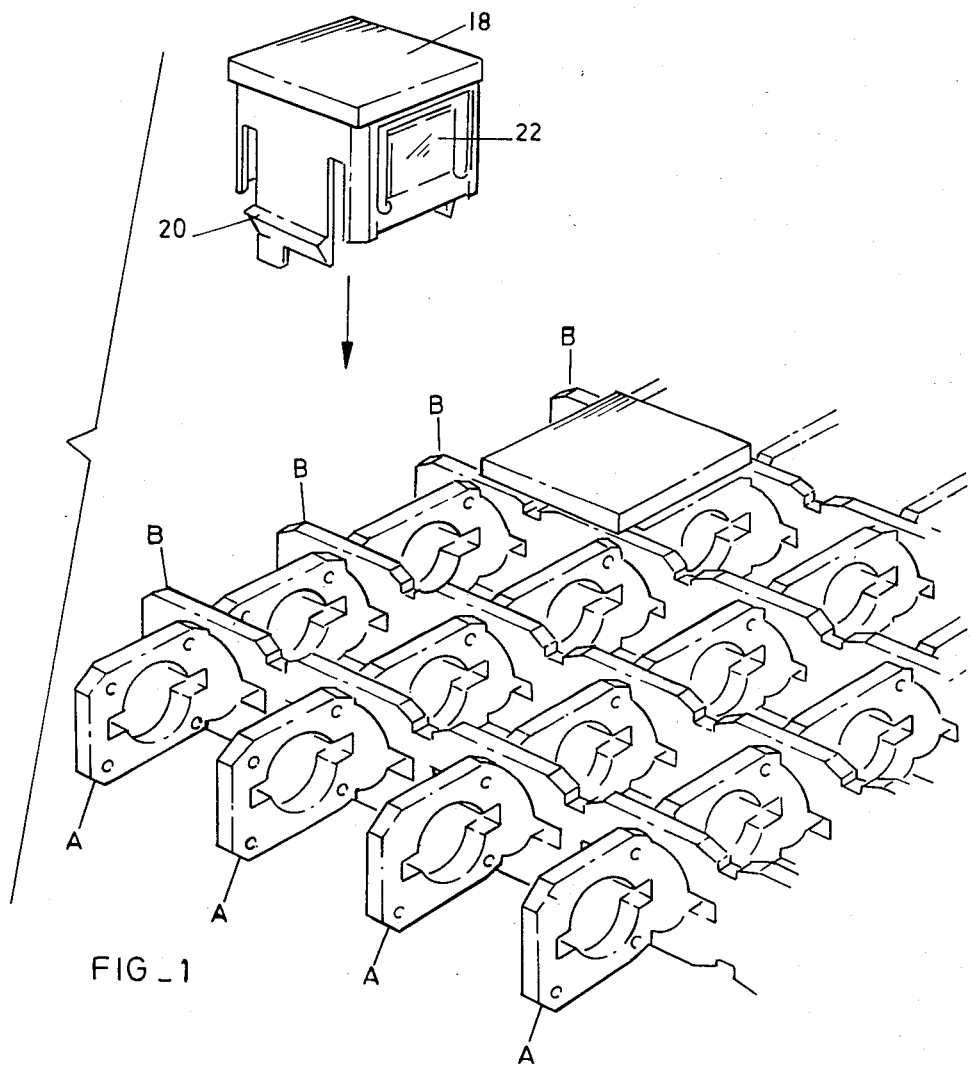
FIG_1
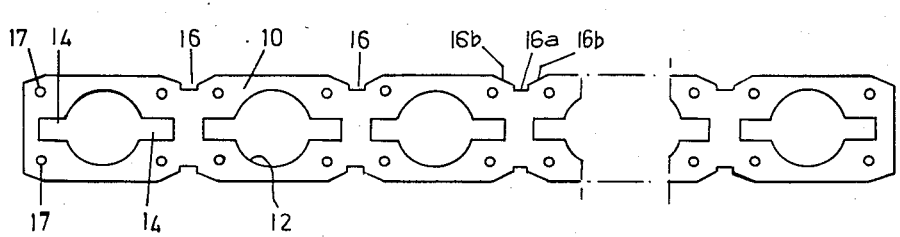
FIG_2

SUPPORT STRUCTURES

BACKGROUND OF THE INVENTION

THE invention relates to lattice work support structures.

The invention is particularly applicable to light weight structures of the kind required for forming a mimic panel. A problem arises especially for small sized structures because assembly is labour intensive and often considerable skill is required especially where supreme accuracy is called for. Further, not all materials which can be provided cheaply are easy to join either because they respond poorly to gluing or welding for example, or the materials do not have intrinsic strength to be reliably threaded.

It is an object of the invention to provide an improved lattice work structure.

SUMMARY OF THE INVENTION

According to the invention there is provided a lattice work support structure for forming a mimic board having a regular array of rectangular apertures for receiving mimic tiles the structure comprising a plurality of like elongate strip members arranged in two sets of parallel members, the one set being at right angles to the other set, each member including an array of regularly longitudinally spaced apertures interspaced with waists therebetween, in which the longitudinal dimension of each aperture is greater than the height of the strip members and the lateral dimension of each aperture is smaller than the height of the strip member but greater than the minimum dimension of each waist such that each member of one set, when its minor axis is at least substantially parallel to the major axes of the members of the other set can slide through the apertures of the other set, and can be rotated when its waists are located opposite a respective aperture of the members of the other set, to form the structure.

Preferably, the longitudinal width of each waist is substantially equal to the width of the strip members so as to provide a close tolerance fit between each of the first set of members and each of the second set of members at the intersection thereof.

The strip member may be formed of metallic material, such as extruded aluminium. The strip member may be formed of plastics material or any other reasonably rigid material.

The apertures of the structure may be square. The lattice work structure may include mimic tiles having rectangular bases which fit into the aperatures of the structure, the faces of which abut against the faces of adjacent tiles to provide a mimic display. The tiles may be provided with means for fixing them to the structure. The fixing means may comprise one or more protrusions resiliently supported to the base of the tiles which lock against the lower surfaces of the strip members when the tiles are in position in the structure. The bases may be provided with means for fixing a lamp holder within the base and below the face of the tile. The lattice work structure may include transverse apertures in at least some of the strip members to allow wiring and the like to pass therethrough.

BRIEF DESCRIPTION OF THE DRAWING

A mimic panel having a lattice work structure according to the invention will now be described by way of example with reference to the accompanying drawing in which:

FIG. 1 shows part of the structure; and
FIG. 2 shows an individual member of the structure.

DESCRIPTION OF A PREFERRED EMBODIMENT

Referring to the drawing, in FIG. 1 a lattice structure comprises a number of elongate strip members (as shown at 10 in FIG. 2) arranged in two sets of parallel members A and B, the A set and B set are at right angles to one another. Each strip member has regularly longitudinally spaced generally circular apertures 12 with opposing slot extensions 14. Each extension has a width which allows a member 10 to pass therethrough and the overall dimension between the bases of opposing slots is just greater than the height of the member 10. The diameter of the circular aperture is just greater then the minimum dimension of waists 16 provided along the member 10 between the apertures 12.

The dimensions therefore permit one strip member 10 to be inserted and slid through an aperture 12 of another strip member by sliding in the slots 14. Whenever a waist 16 is opposite an aperture of the other member, the sliding member can be rotated through 90° and locked against further relative sliding movement. Each waist 16 is shown comprising two central squared-U shaped notches 16a formed directly opposite one another in opposite edges of the respective elongate strip, each such notch being flanked on both of its shoulders by chamfers 16b which cooperate to provide a tapered guide into the notch 16a.

In FIG. 1, the lattice structure is make up by sliding members of the one or other set through the apertures of the other or one set of members respectively. At appropriate relative positions the sliding members can be rotated 90° to the positions shown in FIG. 1.

The members 10 are made of extruded aluminium and the apertures 12, the slots 14 and the waists 16 formed by stamping. When the structure of FIG. 1 is assembled some or all of the intersections can be secured together by any suitable means, including spot-welding and crimping.

A number of small transverse apertures 17 in the strip members can be used alternatively or additionally for wire ties which secure the strip members relative to one another after assembly. The aperture 17 can also be used for the passage of electrical power cables through the structure.

Mimic tiles 18 are then inserted into the structure to form the mimic panel and are retained in the structure by opposed spring clips 20 attached to two opposite sides of the bases of the tiles 18. The upper faces of the tiles abut against the faces of adjacent tiles.

The tiles 18 have resilient flaps 22 for supporting lamp holders (not shown) so that illumination behind selected tiles can be provided where required. The mimic panel provided is easily assembled. There are nomally 1600 tiles per square meter. The tiles of an assembled panel can be easily changed or replaced if required.

Whereas the apertures described have a particular shape as shown other aperture shapes are possible. For example a diamond shape may be used with the longitudinal dimension of each diamond somewhat greater than its vertical dimension. The longitudinal dimension is arranged to allow the members to pass through the aperture and the waist, which may be V-shaped for example if preferred, arranged to fit within the vertical dimension as required. The apertures may be square shaped with diagonals positioned longitudinally and laterally, slots 14 being formed at the ends of the longitudinal diagonal. Thus, in principle the longitudinal and vertical dimensions of the aperture together with the minimum dimension of the waist are suitably chosen to permit insertion and sliding through the aperture in one relative position of the members and to form an interlocking or at least non-sliding connection between respective members in another relative position as described.

The slots 14 are shown extending in a plane at 90° to the minor axis of each strip 10. THe slots 14 can be provided at other angles as desired, for example the plane of the slots may be at 45° to the minor axis. In that case the sliding member entered through the slots 14 and then rotated through 45° to form the structure.

It will be noted that whereas the lattice work structure as described provides a horizontal support for tiles, the structure may be, and normally is arranged to support the tiles with their faces vertically disposed.

In the described arrangement, the tiles are each 25 mm square. The same structure can be used for tiles of 50 mm square in which case only alternate apertures 12 are provided or used in each of the cross-members. Alternatively, the members are formed with apertures separated by 50 mm instead of 25 mm. Similarly, the structure can be formed to support tiles 25 mm by 50 mm, or any desirable dimensions.

In the described mimic board it will be noted that the clips 20 are released by pressing the clips 20 towards one another, conveniently by finger pressure. The tiles 18 can then be moved upwards and out of the support structure. The clips 20 will however retain the tiles at an intermediate position so that once move to the intermediate position, the tile 18 will remain at the intermediate position until fully withdrawn from the structure. This is particularly convenient where it is not physically possible or easy for a person to reach both sides of the structure at the same time. A mimic board is often built into a wall, partition or switch-gear panel. With the tiles described, the tiles 18 can be released by a person at the back of the structure and moved to the intermediate position and then handled by the same person when he has moved to the other side of the partition or panel to withdraw the tiles 18 fully from the support structure.

The described mimic board can be made up having virtually any overall size. Normally the strips 10 are made in one meter lengths so that where larger mimic boards are required the lengths must be joined together. This is done by joining a number of the described structures together. At the joints alternate longitudinal strips are secured relative to one another to extend by 25 mm (or multiples thereof) beyond the structure. A like prepared structure is mated against one end of the structure so that the ends of the longitudinal (or transverse) alternate strips of one structure abut against corresponding strips of the other structure. The joint is completed by sliding in and rotating one or more transverse (or longitudinal) strips and rotating that or those strips through 90°.

It is possible to form joins which provide a non-planar mimic board. This means a mimic board can be made which has a number of inward facing display panels. Preferably, the faces of the tiles secured along the joint are formed with chamfers so that closely abutting surfaces between those tiles are provided.

It is also possible to provide an inwardly curved mimic board. This is achieved by altering the dimensions of the longitudinal and/or transverse strip members to some extent. Normally there is only a requirement to curve the mimic board in one plane and therefore only one of the transverse and longitudinal strip members are altered. The mean longitudinal separation of the apertures 12 is increased so that the apertures 12 are spaced by somewhat more than 25 mm and the strip member is curved correspondingly. A mimic board generally as described can be formed satisfactorily for example having a radius of curvature of as little as around 2½ meters without changing the overall dimensions of the tiles, that is, the "standard" tiles described can be used.

We claim:

1. A mimic board, comprising a lattice work support structure having a regular array of rectangular apertures for receiving mimic tiles, said structure comprising:

a plurality of like elongate strip members of metallic material arranged in two sets of parallel members, the one set being at right angles to the other set, each member including an array of regularly longitudinally spaced apertures interspaced with waists therebetween, in which the longitudinal dimension of each aperture is greater than the height of the strip members and the lateral dimension of each aperture is smaller than the height of the strip member but greater than the minimum dimension of each waist such that each member of one set, when its minor axis is at least substantially parallel to the major axes of the members of the other set can slide through the apertures of the other set, and can be rotated when its waists are located opposite a respective aperture of the members of the other set, to form the structure;

each said waist comprising two centrally-located, squared-U shaped notches formed directly opposite one another in opposite edges of the respective elongate strip member, each such notch being flanked on both shoulders thereof by respective chamfers of substantial extent which cooperate to form a tapered guide into the respective said notch; and a respective mimic tile secured in each of at least several of said apertures, at least some of said mimic tiles each comprising:

a face plate bearing a forwardly-presented surface which is constructed and arranged to display information and to substantially fully cover a respective said aperture; and rearwardly projecting resilient leg means secured to the face plate and constructed and arranged to engage at least two opposed elongate strip members from within a respective said aperture for removably securing the respective said face plate as a covering for said aperture.

2. A mimic board according to claim 1, in which the strip members are formed of extruded aluminium.

3. A mimic board according to claim 1, in which the apertures of the structure are square.

4. A mimic board according to claim 1, including mimic tiles having rectangular bases which fit into the apertures of the structure, the faces of which abut against the faces of adjacent tiles to provide a mimic display.

5. A mimic board according to claim 4, in which the tiles are provided with means for fixing them to the structure.

6. A mimic board according to claim 5, in which the fixing means comprises one or more protrusions resiliently supported to the base of the tiles which lock against the lower surfaces of the strip members when the tiles are in position in the structure.

7. A mimic board according to claim 4, in which the bases of the tiles are provided with means for fixing a lamp holder within the base and below the face of the tile.

8. A mimic board according to claim 1, including transverse apertures in at least some of the strip members to allow wiring and the like to pass therethrough.

* * * * *